(12) United States Patent
Fabian et al.

(10) Patent No.: US 7,556,198 B2
(45) Date of Patent: Jul. 7, 2009

(54) METHODS AND APPARATUS FOR USING NOISE DATA TO ENHANCE BAR CODE SCANNING ACCURACY

(75) Inventors: Kenneth Joseph Fabian, Grayson, GA (US); Sik Piu Kwan, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 118 days.

(21) Appl. No.: 11/533,118

(22) Filed: Sep. 19, 2006

(65) Prior Publication Data

US 2008/0121716 A1    May 29, 2008

(51) Int. Cl.
    *G02B 26/10* (2006.01)
(52) U.S. Cl. .............................. 235/462.25; 235/462.29; 235/462.07
(58) Field of Classification Search ................. 435/462, 435/472, 462.01, 462.29, 462.25, 462.07, 435/462.1, 472.01; 382/260
    See application file for complete search history.

(56) References Cited

U.S. PATENT DOCUMENTS 5,635,700 A * 6/1997 Fazekas ................. 235/462.06
6,164,540 A * 12/2000 Bridgelall et al. ...... 235/462.01
2005/0025377 A1 * 2/2005 Avinash et al. ............... 382/260

* cited by examiner

*Primary Examiner*—Kumiko C Koyama
*Assistant Examiner*—Sonji Johnson
(74) *Attorney, Agent, or Firm*—Priest & Goldstein PLLC; Paul W. Martin

(57) ABSTRACT

Systems and techniques for using signal to noise ratio information to enhance bar code scanning accuracy. Noise information affecting bar code scanning operations is stored and a scan signal is monitored. Upon detection of a scan of a bar code, the signal strength of the scan signal is evaluated and signal to noise ratio values are computed. Signal to noise ratio information is used to favor or disfavor candidate decoding results. In addition, signal to noise ratio thresholds are set according to appropriate criteria. Decoding results are evaluated using the signal to noise ratio thresholds and accepted or rejected depending on whether the thresholds are met. In addition, thresholds for recognition of transitions based on peaks may be set based on expected noise affecting the scan signal, and allowed or excluded based on whether a rise from a negative peak, or fall from a positive peak, meets the threshold.

14 Claims, 6 Drawing Sheets

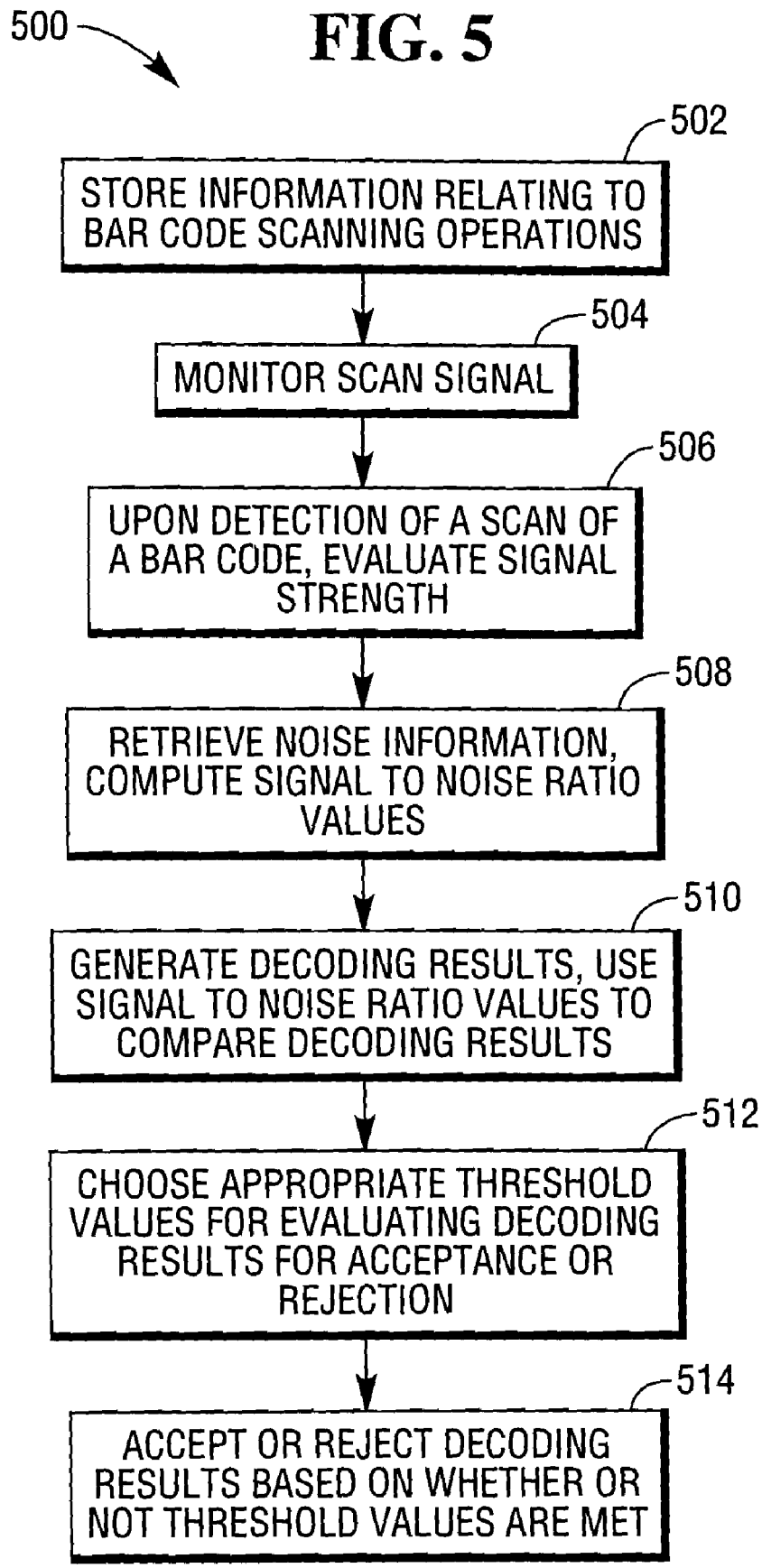

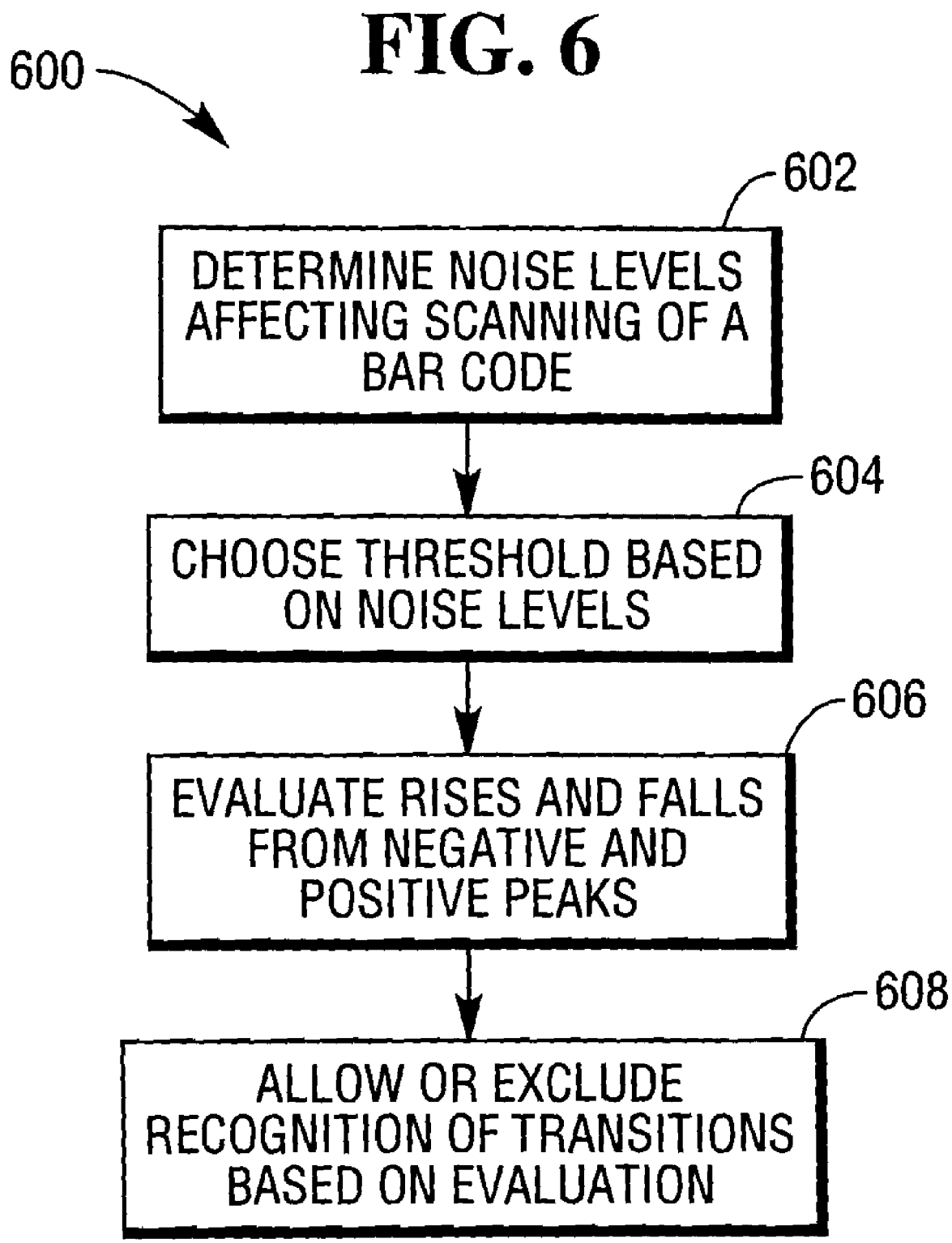

METHODS AND APPARATUS FOR USING NOISE DATA TO ENHANCE BAR CODE SCANNING ACCURACY

FIELD OF THE INVENTION

The present invention relates generally to improvements in optical bar code scanning and the like. More particularly, the invention relates to improved systems and techniques for using information relating to the presence and level of noise and its relative effects on a scan signal in order to improve scanning accuracy.

BACKGROUND OF THE INVENTION

Optical bar code scanning is widely used in a variety of applications. In the typical operation of a bar code scanner, numerous sources of potential error are present. The decoding electronics of a scanner typically receive and interpret a scan signal having as a primary component the actual signal produced as a scan beam moves across light and dark areas of a bar code. The voltages of the scan signal, and the changes in the voltage as the signal achieves positive and negative peaks, are interpreted in order to identify positive and negative transitions. However, noise components are typically present that affect the scan signal and its interpretation. Noise sources may include contributions such as baseline noise inherent in a particular scanner, optical noise such as paper noise produced by characteristics of a bar code label, optical characteristics of various components of the scanner, such as mirrors, window surfaces and other components, optical and electrical characteristics of an environment in which the scanner is used, and other components. Noise may affect the scan signal, adding to or diminishing the scan signal voltage. If such addition or diminishing occurs at critical times, noise may produce a false identification of a peak or failure to recognize a peak.

A typical scan of a bar code involves the intersection of a bar code by one or more scan lines of a scan pattern. The bar code may be completely transected by some scan lines, partially transected by others, and not transected at all by still others. Scan lines that partially transect a bar code may produce a scan signal reflecting incomplete or incorrect data, and scan lines that do not transect a bar code at all may produce a signal reflecting incorrect data, or simply noise. Incorrect data must be rejected in order to achieve accurate results.

The photosignal produced by a scanner regularly undergoes abrupt changes. To take a common example, when no object is within a scan zone of a scanner, the scan signal essentially reflects noise. The signal to noise ratio of the scan signal is therefore less than 1. When an object is introduced into the scan zone and a bar code is intersected by a scan pattern, the signal to noise ratio abruptly changes to a value greater than 1. Immediately around this transition, the probability of a decode error is increased. Numerous other sources of noise and errors may be present.

SUMMARY OF THE INVENTION

Among its several aspects, the present invention addresses such difficulties by using available information relating to signal and noise levels, and characteristics leading to the possibility of decoding errors, to improve decoding accuracy. When a probable edge transition is detected, indicating the presence of a bar code, stored noise information is retrieved and other available noise information is computed. In addition, the level of a scan signal being produced may be determined. The levels of signal and noise prevailing at transitions may suitably be estimated and used in evaluating the reliability of the data indicated by the transition. That is, the relative signal and noise levels may be considered in evaluating whether the behavior of the scan signal at a time of interest, such as an apparent peak, represents an actual transition between a light and dark elements of a bar code.

One useful way of considering the relative signal and noise levels is to compute and evaluate the signal and noise ratios prevailing at times and events of interest. For example, apparent transitions associated with higher signal to noise ratios may be favored over those associated with lower signal to noise ratios. In addition, the signal to noise ratio required for an acceptable scan may be set based on one or more of a variety of factors, such as the presence or absence of error correction features in a bar code, or the importance of the data encoded by the bar code.

In addition, evaluation of noise levels and an understanding of the effect of noise on identification of transitions can be used to give insight into setting thresholds for identifying transitions. In one embodiment of the invention, the peak level of the noise that may be expected from various sources is estimated, and positive or negative signal changes are recognized as representing transitions only if they represent a change from a previous peak of more than some predetermined multiple of the noise level. This multiple may be chosen so as to exclude a designated proportion of false peaks due to noise.

A more complete understanding of the present invention, as well as further features and advantages of the invention, will be apparent from the following Detailed Description and the accompanying drawings.

BRIEF DESCRIPTION OF THE DRAWINGS

FIG. 5 illustrates a process of bar code scanning according to an aspect of the present invention; and FIG. 6 illustrates a process of evaluating a scan signal according to an aspect of the present invention.

DETAILED DESCRIPTION

Figure 1:
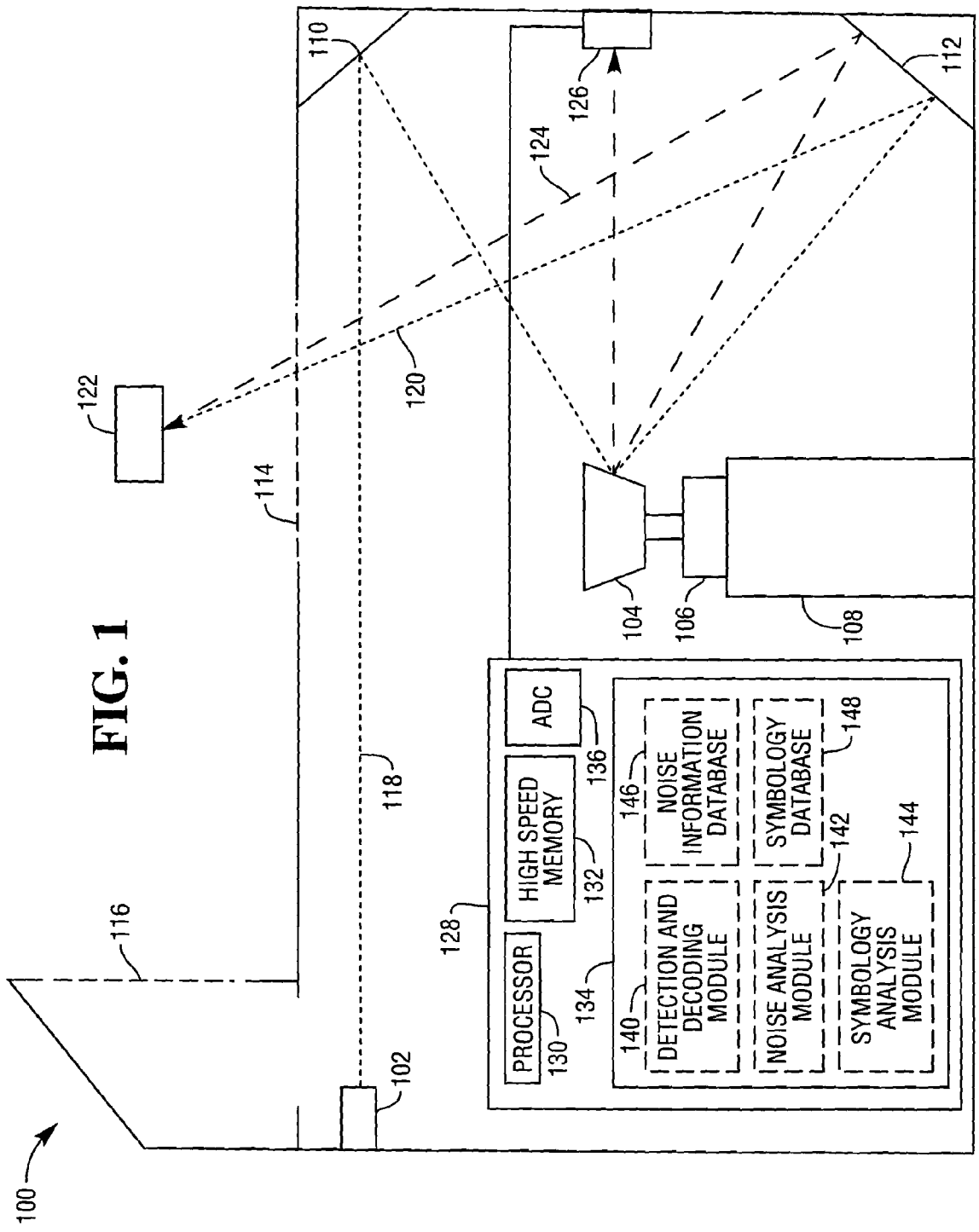
FIG. 1 illustrates a bar code scanner according to an aspect of the present invention.

FIG. 1 illustrates a scanner 100 according to an aspect of the present invention. The scanner includes a laser source 102, a rotating spinner 104, rotated by a motor 106 and mounted on a pedestal 108, and fixed mirrors 110 and 112. The scanner 100 also includes a horizontal scan window 114 and a vertical scan window 116. The laser source 102 emits a laser beam 118, which is reflected from the fixed mirror 110, the spinner 104, and the fixed mirror 112, emerging from the scanner 100 through the horizontal window 114. On its final path out of the scanner 100, the laser beam is conveniently referred to as a scan beam 120. The scan beam 120 strikes an object 122, which scatters light, some of which is returned to the scanner 100 through the scan window 114. The exemplary light beam 124 is illustrated here as being reflected from the object 122 and directed from the mirror 110 and the spinner 104 to a photodetector 126. The photodetector 126 generates a photosignal, suitably referred to as a scan signal.

The scan signal is supplied to a bar code detection and decoding unit 128, suitably comprising a processor 130, high speed memory 132, and long term memory 134. The detection and decoding unit 128 receives the scan signal, suitably using an interface capable of presenting the signal in a format that can be easily operated on by the processor 130. In the present exemplary embodiment, this presentation is accomplished by digitizing the scan signal, and the interface is an analog to digital converter (ADC) 136, which receives the scan signal produced by the photodetector 126 and converts it to digital form for analysis by the processor 130.

The detection and decoding unit 128 enhances decoding accuracy and reliability by using information relating to noise levels affecting the scan signal, and the level of the scan signal, and by computing a signal to noise ratio. The signal to noise ratio is taken into account in decoding the scan signal. Factors considered in evaluating the effect of the signal to noise ratio on decoding include the signal to noise ratio characterizing various possible decoding results, the susceptibility to noise of the particular bar code under analysis, and the relative seriousness or lack of seriousness of the consequences of a decoding error.

The detection and decoding unit 128 employs a detection and decoding module 140, a noise analysis module 142, and a symbology analysis module 144. The modules 140, 142 and 144 are suitably implemented as software stored in the long term memory 134 and transferred to high speed memory 132 as needed for execution by the processor 130.

The detection and decoding module 140 monitors the digitized scan signal generated by the ADC 136. The detection and decoding module 140 subjects the scan signal to analysis using techniques known in the art for detecting the presence of a bar code and extracting bar code information from the scan signal. The detection and decoding module 140 is able to interpret transitions and threshold crossings in the scan signal to detect data elements represented by the scan signal. The results of decoding each data element may be more or less reliable depending on the effects of noise on the scan signal, and the detection and decoding module 140 may favor or disfavor particular data elements, or set thresholds for accepting or rejecting data elements, based on analysis results received from the noise analysis module 142.

Numerous sources of noise can be evaluated during design or installation of the scanner. Noise information can be stored for use in computing a signal to noise ratio prevailing at the time of decoding of any particular data element. Noise sources include electrical noise associated with the operation of the scanner 100. This electrical noise can be used as a noise floor, that is, as a minimum level of noise that will be present, because such noise is inherent in the scanner.

Other factors contributing to noise include optical noise and losses, label contrast, with a lower label contrast tending to create a higher level of noise, distance and angle between label and scanner, and optical convolution. Labels having small elements are particularly subject to being affected by optical convolution. For each source of noise that may affect the operation of the scanner 100, and for which predictable noise information can be obtained and evaluated, this noise information is stored in a noise information database 146. Different types of noise information may be stored in different ways. For example, electrical noise may maintain a relatively constant value, so a single value may be stored for electrical noise. Printing and paper noise is typically dependent on a type of label being used, so an identification of each label type may be stored, along with a value indicating the expected noise level associated with the label type.

Overall noise varies, and the signal to noise ratio can be estimated by evaluating the scan signal. During the time a scan beam passes over a bar code, the scan signal exhibits positive and negative peaks that represent light and dark elements of a bar code. At these times, the level of the scan signal, frequently expressed as a voltage, exhibits substantial differences as the scan signal achieves significant positive peaks when the scan beam passes over light areas of a bar code and significant negative peaks when the scan beam passes over dark areas of a bar code. At other times, the scan signal does not exhibit such great differences. When the scan beam is not passing over a bar code, the scan signal is typically influenced largely by noise, and stays within a relatively narrow range as compared to the range of the scan signal when the scan beam is passing over a bar code. Therefore, a reasonable estimate of a signal to noise ratio of a scan signal can be achieved by taking the ratio of the voltage of the signal when the scan beam is in the light areas of the label versus the voltage when the scan beam is in the dark areas. At transitions between light and dark areas, this computation will yield a result that provides a relatively high ratio, compared to times during which no object is within the scan volume or the scan beam is passing over areas of a product other than the bar code label. In addition, influences such as paper noise that tend to increase the likelihood of errors will also tend to reduce the signal to noise ratio as computed in this way. Noise that tends to induce errors will do so by reducing the absolute values of the levels of positive and negative peaks, and therefore will reduce the signal to noise ratio as computed by the ratio of the scan signal at light and dark areas of a bar code. The signal level may be monitored across transitions and used to estimate signal to noise ratios on an element by element basis. Once this is done, these values may be made available for later decision processes that treat the entire label, or parts of the label, together.

Figure 2:
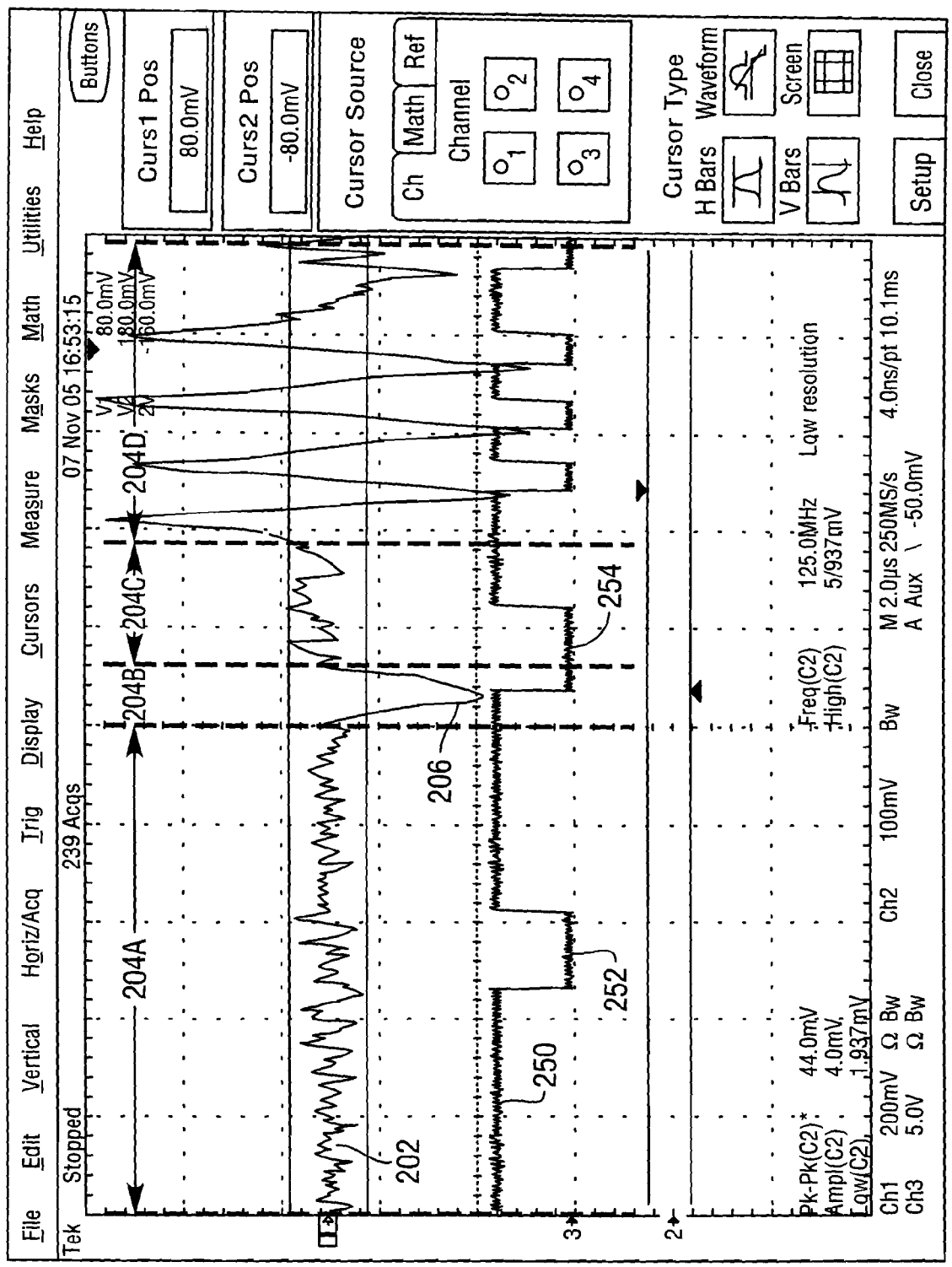
FIG. 2 illustrates an exemplary scan signal suitably interpreted by a bar code scanner according to an aspect of the present invention.

FIG. 2 illustrates an oscilloscope display 200, showing an exemplary scan signal 202. The scan signal 202 follows the progress of a scan beam as it passes through space without encountering a bar code label, and then strikes the edge of a label, passes through an area of the label before the bar code begins, and then passes over light and dark spaces making up the bar code. The scan signal 200 may be characterized as including regions 204A, 204B, 204C and 204D. The region 204A is the region of the scan signal 200 created by passage of a scan beam through an area absent of any bar code label. In the region 204A, the signal 200 consists primarily of external noise. In the region 204B, the scan beam is passing over the edge of the bar code label, causing a significant negative pulse 206. In the region 204C, the scan beam is passing over a "quiet" area of the bar code in which the scan beam is scattered from a relatively uniform surface, such as white paper. In this region, the signal 200 consists primarily of external and paper noise. In the region 204D, the scan beam is passing over the bar code, causing the creation of distinct positive and negative pulses in the scan signal 200. The noise present in the regions 202A and 202B may exhibit peaks that can be misinterpreted as transitions. The waveform 250 represents one interpretation of the scan signal 200, showing a false transition 252 as a result of noise peaks in the region 202A, and a false transition 254 as a result of the negative peak 206, which is essentially a noise peak. Proper evaluation of a scan signal such as the signal 200 may prevent recognition of false transitions, for example by requiring a relatively high signal to noise ratio in order to recognize a transition, and by closely examining, or rejecting, apparent transitions that are accompanied by abrupt changes in the signal to noise ratio of the signal.

Returning now to FIG. 1, the detection and decoding module 140 processes the digitized scan signal received from the ADC 136. In addition, information generated by the ADC 136 is used by the noise analysis module 142 to determine the signal level of the scan signal. The noise analysis module 142 may suitably use noise information, for example, stored information indicating expected noise levels for the prevailing environment and label type retrieved from the database 146, as well as signal level information received from the ADC 136, to generate signal to noise ratio (SNR) values. Signal to noise ratio values may be supplied to the detection and decoding module 140 as needed, and may advantageously be continuously supplied to the detection and decoding module 140. Alternatively, the noise analysis module 142 may process the signal received from the ADC 136 to estimate the signal to noise level by making voltage comparisons for light versus dark areas, such as by taking the ratio of voltages for light versus dark areas. In the exemplary scan signal 200 of FIG. 2, an analysis may yield a low estimate for the signal to noise ratio for the regions 202A and 202C and a higher estimate for the signal to noise ratio for the region 202D. In the regions 202A and 202C, the difference between positive and negative peaks is relatively small, while in the region 202D, the difference between positive and negative peaks is significantly greater. In the region 202B, the estimate for the signal to noise ratio may therefore be higher than that for the regions 202A and 202C, but still significantly lower than that for the region 202D, because the relatively large negative peak 206 is not accompanied by a high positive peak. In addition, the abrupt changes in the scan signal 200 from the region 202A to 202B may be interpreted in order to produce an abrupt change in the estimate for the signal to noise ratio between those regions, thus giving rise to close scrutiny, of the peak 206, or rejection of recognition of the peak 206 as indicating a transition.

Returning now to FIG. 1, the detection and decoding module 140 operates by processing a scan signal to detect and interpret transitions between light and dark areas of a bar code, that is, between bars and spaces of the bar code. The scan signal is monitored to identify probable edge detections. An edge detection is an abrupt change in luminosity, and in the context of bar code scanning may indicate the beginning or end of a bar code label, or indicating a transition between light and dark areas within the bar code. A probable edge detection indicates an area of interest in the scan signal, such as a sequence of transitions to be interpreted. Whenever a probable edge is detected, the detection and decoding module 140 is able to use signal to noise ratio information to enhance the accuracy of decoding data represented by the transition that may be indicated by the probable edge detection, and is also able to use signal to noise ratio to evaluate the data indicated by a sequence of consecutive edge detections, which may represent a sequence of transitions and therefore one or more data elements.

Each transition or sequence of transitions that can be interpreted can be thought of as a data element. The interpretation of data elements is more or less reliable depending on the signal to noise ratio characterizing the scan signal as the data elements are interpreted. In order to provide insight into the reliability of interpretation of different data elements, the detection and decoding module 140 receives signal to noise ratio information from the noise analysis module 142 and evaluates the signal to noise ratio information as needed.

The use of signal to noise ratio values takes into account not only signal strength but noise, so that the fact that signal strength is relatively low will not be given undue weight if the noise affecting the signal is also low. For example, if a bar code is positioned at a relatively great distance from a scan window may exhibit a relatively low signal strength. However, if the level of noise affecting the scan signal is low, this signal strength will be sufficient to produce a reliable result, and may well produce a more reliable result than a stronger signal affected by a greater level of noise. The use of signal to noise ratios to evaluate results will balance signal strength and noise level in a way that reflects the effects of signal strength and noise on decoding results.

It is possible for the detection and decoding module 140 to evaluate the reliability of the interpretation of each data element comprising bar code information. In many cases, it will be convenient to interpret the scan signal to extract information for a complete bar code, and to use signal to noise ratio information to evaluate the reliability of the extraction. The evaluation can be performed during decoding. As an alternative, a complete or partial decoding can be performed and the signal to noise ratio information used to assess the reliability of the decoding. Different decodings of the same bar code, such as those resulting from intersections of the bar code by multiple scan lines making up a scan pattern, may be performed, with each decoding being evaluated for reliability and the most reliable decoding result chosen, if the decoding results differ from one another. Alternatively or in addition, the reliability of the decoding results may be compared against a threshold that can be higher or lower depending on any of a number of criteria. Some of the criteria include the type of label being used, or the seriousness of the consequences of a decoding error.

To take an example, suppose that a bar code is a universal product code encoded with the data 0 23455 23536 2. Such a bar code includes error detection and correction features, as well as the substantive information encoded into the bar code. During a scan, the bar code is intersected six times, twice each by three scan lines. The first three intersections come immediately upon the introduction of the object bearing the bar code into the scan volume, and the second three intersections come after the object has been introduced into the scan volume and has remained there through the first three intersections. The first of each set of three intersections is a complete transection of the bar code, and the second two of each set are partial transections.

The scan signal produced by this scenario exhibits a relatively low signal to noise ratio during the first set of three transactions. The portion of the scan signal representing the second and third transactions exhibits a lower signal to noise ratio than does the first.

During the second set of three transections, the signal to noise ratio is higher than during the first, and higher for the first transection of the set than for the second and third. The noise analysis module 142 retrieves noise information from the database 146 and receives signal strength information from the ADC 136. The noise analysis module 142 computes signal to noise ratio information and supplies this information to the detection and decoding module 140.

The detection and decoding module 140 performs decoding of the scan signal and uses the signal to noise ratio information received from the noise analysis module 142 in order to evaluate the information reflected in the scan signal. The signal to noise ratio is highest for the second set of transactions, and for the first transection occurring in that set. The detection and decoding module 140 suitably decodes the scan signal to extract a candidate decoding result for each transection of the bar code, and compares the candidate decoding results that are produced. Exemplary candidate decoding results may appear as follows:

| Candidate decoding result | SNR |
|---|---|
| 0 23875 00000 0 | 1.2 |
| 0 23455 23500 0 | 0.75 |
| 0 23000 23536 2 | 0.85 |
| 0 23455 23536 2 | 4.0 |
| 0 23455 23000 0 | 2.5 |
| 0 23000 23536 2 | 2.5 |

The fourth value, namely, the value 0 23455 23536 2, associated with a signal to noise ratio of 4.0, has the highest associated signal to noise ratio and is therefore favored by the detection and decoding module 140. The above scenario is exemplary, and it will be recognized that the signal to noise ratio values may be only one parameter out of a number of parameters that may be evaluated in selecting a value to be chosen as a decoding result. For example, suppose that a scan of a bar code produces six candidate decoding results, five of which are identical. Suppose further that these decoding results have associated signal to noise ratios of 5.0. If the sixth candidate decoding result is different from the other five, and has an associated signal to noise ratio of 5.5, the higher signal to noise ratio may be taken into account in the evaluation, but may not necessarily control the evaluation. Instead, the fact that a significant number of candidate decoding results are identical, and have a reasonably high signal to noise ratio associated with them, may be taken into account in determining that the identical candidate decoding results represent the most accurate result.

Although generating decoding results for a complete bar code is described here by way of example, it will be recognized that signal to noise ratio information may be used to evaluate partial or intermediate decoding results. For example, signal to noise ratio information may be used to evaluate decoding results as each bit of a bar code is decoded, with different alternative candidate decoding results for each bit being given greater or lesser weight depending on comparative evaluation of signal to noise ratio information for the different alternative candidates. This comparative evaluation may be performed as each bit is decoded, or a bit by bit comparison may be performed on each set of candidate decoding results representing an attempt at decoding of a bar code.

In addition to using signal to noise ratios to compare different candidate decoding results, the detection and decoding module 140 may also set a signal to noise ratio threshold against which the signal to noise ratio for the candidate decoding results may be compared to determine if any result is acceptable. Different types of labels may call for the use of higher or lower thresholds. For example, a universal product code label has error detection and correction features. Therefore, a lower signal to noise ratio may be used in decoding such a label, because erroneous results can be detected and corrected using features of the label. For bar codes lacking such error correction and detection features, such as interleaved 2 of 5 codes, a higher signal to noise ratio may be required.

In order to determine the signal to noise ratio threshold to be used, the detection and decoding module 140 may use stored information defining the symbology of bar codes being used. This information may appear in a label symbology database 148, shown here as stored in the long term storage 134. It will be recognized that alternative storage, such as a central repository remotely accessible to the scanner 100, may be used to host the database 148.

The database 146 may include threshold information for each symbology to be used, or alternatively the detection and decoding module 140 may calculate a threshold to be used for a particular symbology, with or without reference to the database 148. As a further alternative, a threshold value to be used for a particular symbology may be selected when the scanner 100 is placed into operation, again with or without reference to the database 148.

If only one type of bar code is to be used in a particular operation, it is a relatively simple matter to select an appropriate signal to noise ratio threshold. The choice of the threshold is suitably based on characteristics of the scanner 100, properties of the environment in which the scanner 100 is used, and characteristics of the label symbology being used. A predetermined threshold value may be entered, or a threshold value may be calculated. The threshold value is then used as needed.

If a plurality of different symbologies are used, the symbology being used must be identified in order to use a threshold value associated with the symbology. To accomplish such identification, the detection and decoding module 140 passes tentative decoding results to the symbology analysis module 144. For purposes of identifying the symbology used in a bar code, even ambiguous, incorrect, or partial results will often be sufficient.

When the symbology analysis module 144 receives a set of tentative decoding results, the module 144 performs appropriate analysis on the results, such as examining them to determine if they include sufficient information to identify a symbology, or to determine whether different tentative results conflict in which symbologies they appear to indicate. If a conflict occurs, the symbology typically cannot be identified accurately. In identifying the symbology, the module 144 may use the database 148, which suitably includes a plurality of entries, with each entry including identification of a bar code symbology, a catalog of features that may be used to associate decoding results with the bar code symbology, and a signal to noise ratio associated with the bar code symbology. The module 144 searches the database for a catalog of features matching the features characterizing the set of tentative decoding results.

Once the analysis is complete, the symbology analysis module 144 passes its results to the detection and decoding module 140. If a symbology has been identified, the detection and decoding module 140 chooses a threshold appropriate for the symbology, suitably by retrieving appropriate information from the database 148. If the symbology analysis module 144 has been unable to identify a symbology, the detection and decoding module 140 suitably selects a threshold using other means, such as choosing a default threshold.

As an alternative to setting a threshold for a bar code as a unit, the detection and decoding module 140 may set thresholds for elements of the bar code, such as digits or bits. In order to set such thresholds, as the detection and decoding module 140 detects and identifies each data element for which it is desired to set a threshold, the signal to noise ratio characterizing the portion of the scan signal representing the element is computed, and an appropriate threshold is set for the data element, for example, by receiving symbology identification results from the symbology analysis module 144 and identifying thresholds to be set for elements of the identified symbology using information stored in the database 146. One particular symbology for which setting of thresholds for individual data elements, such as bits, may be particularly advantageous is the RSS-14 symbology, which exhibits a wide dynamic range of bar width.

The setting of thresholds as high or low may be based on numerous criteria chosen as an alternative, or in addition, to the presence or absence of error correcting features in a bar code symbology. For example, the importance of correct identification of a product may be greater or lesser depending on the nature of the product. For example, correct identification of prescription drugs is of critical importance, while correct identification of products sold at a one price store, such as a dollar store, is much less critical. A high signal to noise ratio threshold may be set for products for which identification is critical, and a low signal to noise ratio threshold may be set for products for which identification is less critical. Products can be identified as more or less critical by using appropriate bar code symbologies, which can be stored in the symbology database 148.

In addition to setting thresholds for or based on signal to noise ratios, significant advantages in accuracy can be achieved by understanding the effects of noise on signal peaks and evaluating changes from positive or negative signal peaks based on whether or not they will be misinterpreted due to the presence of the expected level of noise. The detection and decoding module 140 may suitably use these techniques in order to inform recognition of a transition based on a comparison of scan signal changes versus known or estimated levels of noise.

Figure 3A:
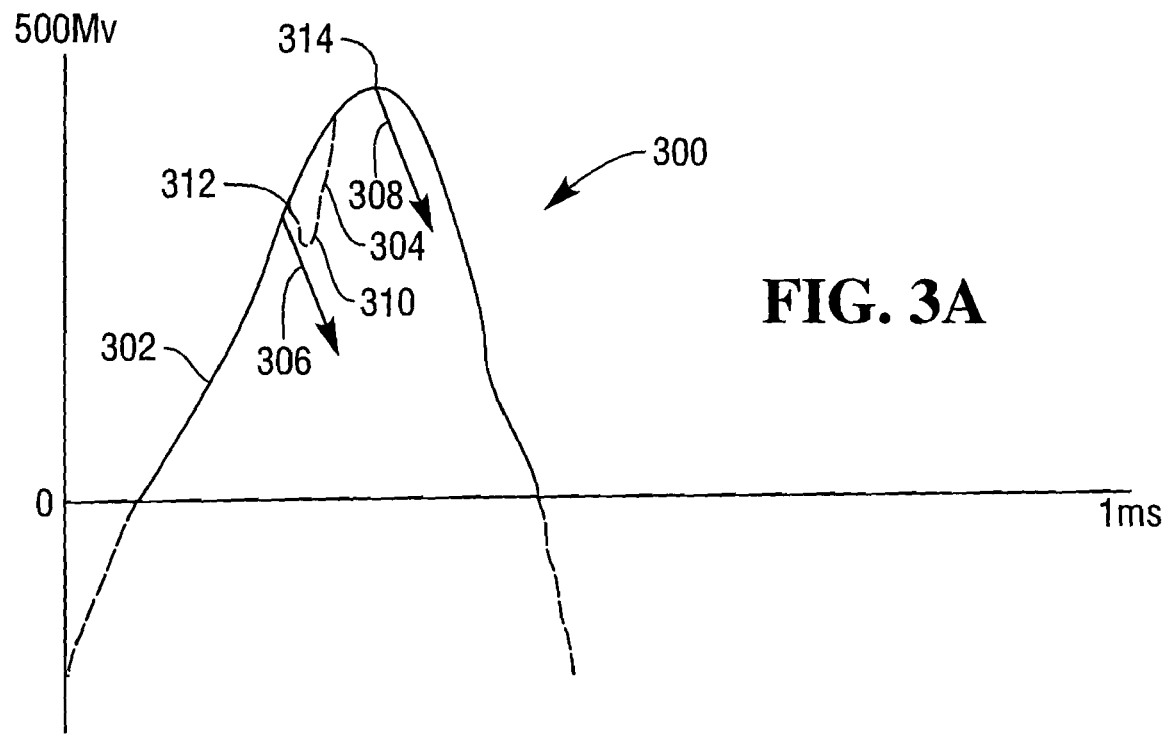
FIG. 3 illustrates an exemplary scan signal showing features and phenomena that may be analyzed by a bar codes scanner according to the present invention.

FIG. 3A is a graph 300 showing an exemplary scan signal 302 that may be interpreted using techniques according to an aspect of the present invention. The values shown on the axes of the graph 300 are exemplary only. The scan signal 302 may be altered by noise, with the noise adding to or subtracting from the level of the signal. The dashed line 304 represents an alteration of the scan signal 302 by the addition of subtractive noise, which has the effect of altering the signal 302 as shown.

The scan signal 302 is interpreted in order to recognize positive and negative transitions representing light and dark areas of a bar code by recognizing a transition based on the change of the signal 302 from a previous peak. In the example shown, if the scan signal 302 falls from a positive peak by more than a threshold amount, a positive transition is recognized, and if the scan signal 302 rises from a negative peak by more than a threshold amount, a negative transition is recognized. The threshold is chosen based on expected noise levels, and is preferably chosen so as to exclude a specified percentage of noise peaks. Such a threshold insures that a rise or fall exceeding the threshold will have a probability equal to the specified percentage of representing a true transition.

For example, suppose that for an expected noise level, 97% of the noise peaks are at or below the expected level and 99.9% of the noise peaks are at or below 1.4 times the expected level. If a threshold level of change, represented here by the arrows 306 and 308, is chosen to be 1.4 times the expected noise, then changes that do not reach that threshold will not be recognized as transitions, but changes that reach that threshold will be recognized. Thus, the false negative peak 310 is not recognized as representing a transition, because the change it represents does not exceed the threshold represented by the arrow 306. The point 312 at which the negative change represented by the dashed line 304 is therefore not recognized as a true positive peak. On the other hand, the peak 314 is recognized as a true positive peak, and can be recognized as representing a transition, because the fall from that peak it exceeds the threshold represented by the arrow 308, and therefore is highly unlikely to result from noise.

Figure 3B:
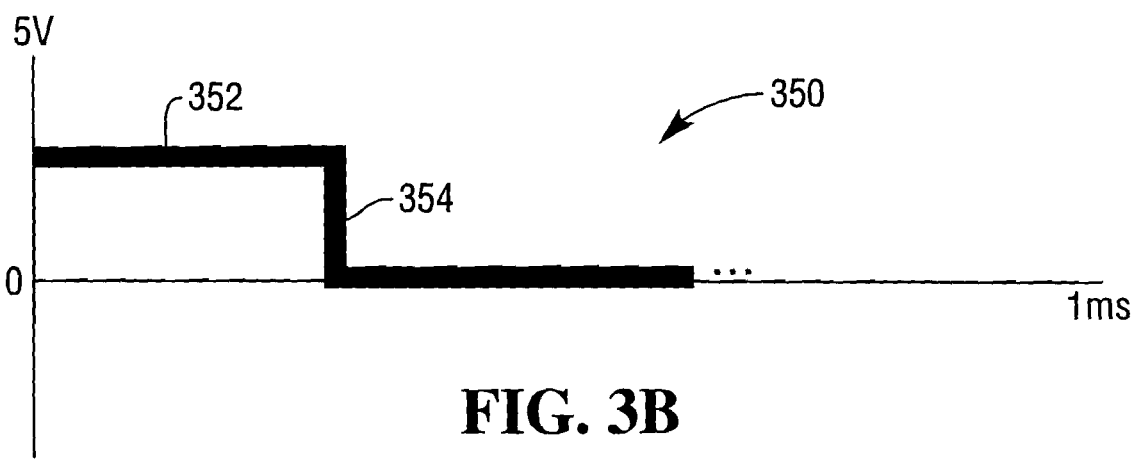

Thus, FIG. 3B illustrates a graph 350, showing a waveform 350, representing positive and negative transitions resulting from interpretation of the signal 302. The values shown on the axes of the graph 350 are exemplary only. The waveform 350 includes a transition 352 at the time of the peak 314, but no transition at the time of the point 312.

Figure 4:
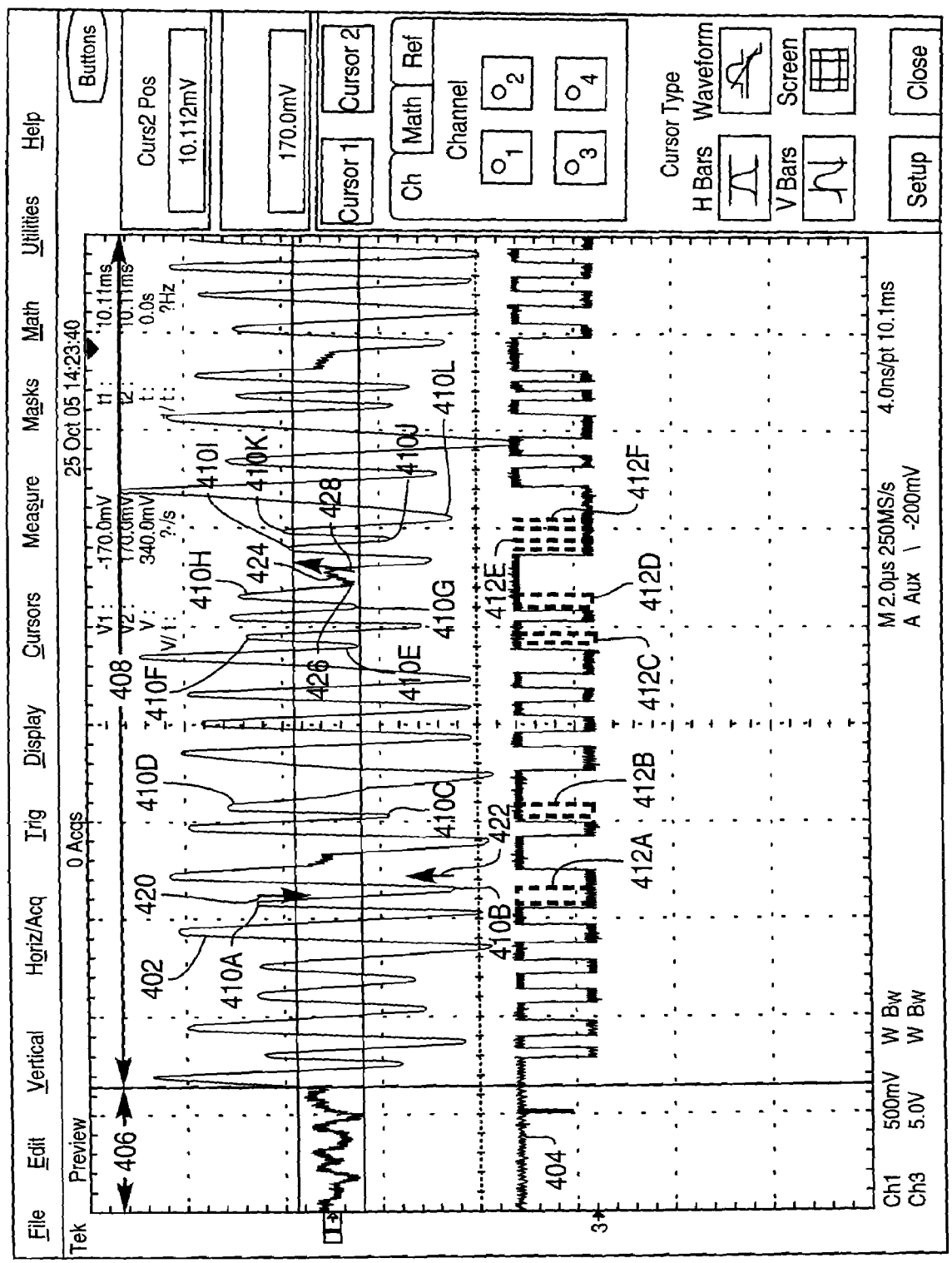
FIG. 4 illustrates an exemplary scan signal and features of the scan signal advantageously interpreted using systems and techniques according to an aspect of the present invention.

FIG. 4 illustrates an oscilloscope scan 400 showing an exemplary scan signal 402 such as may be produced by scanning of a 5 mil Universal Product Code (UPC) label, and a waveform 404 representing transitions resulting from interpretation of the signal 402. The signal 402 includes a noise region 406, representing a time when the scan beam has not yet reached a bar code, and a valid signal region 408. In the valid signal region 408, the scan signal 402 reflects the scan beam's movement between light and dark areas of a bar code. In the valid signal region 408, the signal 402 includes numerous positive and negative peaks, of which the peaks 410A-410L are of particular interest because they are of such a nature that prior art techniques for the setting of thresholds may improperly fail to detect the transitions represented by these peaks. Most of the peaks 410A-410L are smaller in magnitude than preceding peaks, but are nevertheless substantially larger in magnitude than noise peaks for noise levels that may be expected.

Many prior art techniques of setting thresholds for recognition of peaks as representing transitions are based primarily or exclusively on relative signal levels. In many implementations, a threshold is based on a signal peak, and goes to a relatively high level after the signal exhibits a relatively high peak, with the threshold gradually decaying and then rising again if another high peak is encountered. If a higher peak is followed by one or more lower peaks, one or more of lower peaks follows may be incorrectly excluded from recognition as representing a transition, because the higher peak causes a higher threshold, which only gradually decays to a lower level. The solid portions of the waveform 404 represent the transitions that might be reliably detected using prior art techniques wherein the threshold rises at higher signal peaks and gradually decays. The pulses 412A-412F, shown using dashed lines, represent pairs of transitions that might not be detected using such a prior art technique, but which are detected by evaluating the signal 402 based on noise levels.

Considering noise in evaluating whether a peak is to be recognized as representing a transition allows the recognition or nonrecognition to be based on whether or not the fall or rise from a positive or negative peak is sufficient that the possibility that the fall or rise is due to noise can be excluded with a sufficient degree of certainty. In the present example, the expected noise is 120 mV and 1.4 times this value is 170 mV. If it has been determined that 99.9% of the noise peaks are less than 170 mV, a change of more than 170 mV from a previous peak can be reliably attributed to a genuine transition, rather than noise. Thus, the pulse 410A includes successive positive and negative transitions based on a recognition that the signal 402 has undergone first a negative, then a positive, change of more than 170 mV from a previous peak, indicating that the peaks from which the changes occurred are genuine peaks highly unlikely to be errors based on noise. It can be seen that the negative and positive changes from the peaks 410A and 410B, respectively, significantly exceed the magnitudes of the arrows 420 and 422, which represent a threshold of 170 mV, or 1.4 times the expected noise peaks for the signal 402. The remaining pulses 412B-412F represent similar recognitions that the peaks 410C and 410D, 410E and 410F, 410G and 410H, 410I and 410J, and 410K and 410L are genuine because they are followed by positive or negative changes exceeding the established threshold based on noise. On the other hand, the positive peak 424 does not represent a rise from the negative peak 426 of a greater extent than the arrow

428. It can thus be determined that the negative peak 426 is likely caused by noise and does not represent a genuine transition, so that no transition is recognized through the behavior of the signal 402 as a result of the change between the peaks 426 and 424.

The particular noise level and threshold shown here are exemplary, and any suitable threshold may be selected based on the known and estimate noise and the behavior of the signal being interpreted. In addition, the threshold level may vary across the scan signal if the noise level varies. The detection and decoding module 140 of FIG. 1 may suitably employ analysis of the type described above, receiving noise information from the noise analysis module 142 or the noise information database 146, or both, and evaluating peaks in a scan signal based on thresholds set according to an estimate of a level that will exclude a desired proportion of noise-generated false peaks. Such a procedure may be employed as an alternative, or in addition, to determining signal to noise ratios associated with decode results and evaluating the scan signal based on associated signal to noise ratios. In addition, it will be recognized that meeting the threshold need not be considered both a necessary and sufficient condition for recognizing a transition, because other factors may need to be considered. However, the information as to whether or not a fall or rise from a peak meets the threshold is valuable in allowing or excluding recognition of a transition, with further analysis of an allowed recognition being based on any additional factors that may need to be considered.

FIG. 5 illustrates the steps of a process 500 of bar code detection and decoding according to an aspect of the present invention. At step 502, information relating to bar code decoding operations is stored for later use. Such information may suitably include noise information, bar code symbology information, information relating to appropriate signal to noise ratio thresholds for different symbologies, and information relating to the relative importance or unimportance of accuracy in decoding results. At step 504, a scan signal is monitored. At step 506, upon detection of a scan of a bar code, the strength of the scan signal is evaluated. At step 508, noise information indicating noise levels affecting the scan signal is obtained, for example by retrieving previously stored noise information, and the scan signal strength and the noise information are used to generate signal to noise ratio values for the scan signal. In addition, or as an alternative, the scan signal may be evaluated in order to estimate the signal to noise ratio of the scan signal.

At step 510, decoding results are generated and signal to noise ratio values for the decoding results are used to compare the decoding results to one another, with decoding results associated with higher signal to noise ratios being favored over decoding results associated with lower signal to noise ratios. At step 512, appropriate signal to noise ratio threshold values are chosen for use in accepting or rejecting decoding results. Criteria for selecting the threshold values may include characteristics of the bar code symbologies being used, or the relative importance of accurate decoding results in particular situations. At step 514, decoding results are accepted or rejected depending on whether or not the threshold values are met.

FIG. 6 illustrates a process 600 of bar code detection and decoding according to another aspect of the present invention. The process 600 may suitably be performed using a system such as the system 100 of FIG. 1, and may be employed in conjunction with a such as the process 500 of FIG. 5, allowing for analysis of peaks in light of noise information, as well as preferences, or acceptance or rejection, of data elements based on signal to noise ratio information.

At step 602, noise levels affecting scanning of a bar code are evaluated. These noise levels may include baseline noise levels affecting a scanner, such as electrical noise inherent in the scanner operation, as well as electrical and optical noise affecting the scanner's operation as deployed in a particular location. The noise levels may also include noise related to the scanning of the label itself, such as paper noise. At step 604, a threshold is chosen based on the noise levels that have been determined. The threshold defines a required rise or fall from a negative or positive peak sufficient to trigger recognition of a transition from a light to a dark, or a dark to a light, area of a bar code, and may suitably be based on a desire to exclude a specified proportion of noise peaks, based on the noise affecting scanning the signal. Depending on the conditions affecting a particular scan, the same threshold may be used, or the threshold may vary as noise affecting the behavior of the scan signal varies.

At step 606, during scanning of a bar code, each rise or fall from a negative or positive peak is evaluated in light of the threshold for that peak. At step 608, recognition between light and dark areas of a bar code is allowed or excluded based on the evaluation. If the fall or rise of the signal meets the threshold, a recognition of a transition is allowed; otherwise, recognition of the transition is excluded.

While the present invention is disclosed in the context of a presently preferred embodiment, it will be recognized that a wide variety of implementations may be employed by persons of ordinary skill in the art consistent with the above discussion and the claims which follow below.

We claim:

1. A detection and decoding unit for a bar code scanner, comprising:

an interface for receiving a scan signal generated by detection of a reflected scan signal generated by reflection of a scan beam emitted from a scan window of the scanner and directed back into the scanner through the scan window; and a processor operative to process the scan signal received by the interface, the processor being operative to receive information relating to the signal strength of the scan signal and information relating to levels of noise affecting the scan signal and to compute a plurality of signal to noise ratios for the scan signal, the processor being operative to process the scan signal to generate a plurality of candidate decoding results representing one or more bar code data resulting from an attempt to decode a bar code, to associate the signal to noise ratios with the decoding results, to perform a comparative evaluation of the candidate decoding results including a comparison of the signal to noise ratios, and to choose one of the candidate decoding results based upon the comparative evaluation.

2. The detection and decoding unit, of claim 1, wherein the processor is operative to estimate the signal to noise ratios of the scan signal based on characteristics of the scan signal.

3. The detection and decoding unit of claim 2, wherein the processor is operative to estimate the signal to noise ratios of the scan signal based on comparative characteristics of the scan signal as a scan beam whose reflections are detected by a photodetector to generate the scan signal passes from between light and dark areas of a bar code.

4. The detection and decoding unit of claim 1, wherein each candidate decoding result represents an attempt to decode a complete bar code.

5. The detection and decoding unit of claim 4, wherein the plurality of candidate decoding results represents an attempt to decode a data element within a bar code and wherein performing comparative evaluation of the candidate decoding results comprises performing comparative evaluations of candidate decoding results corresponding to the same data element of the bar code.

6. The detection and decoding unit of claim 4, wherein comparative evaluation of the candidate decoding results includes evaluation of a plurality of factors affecting accuracy of the decoding results, one of the factors being the signal to noise ratios associated with the decoding results.

7. The detection and decoding unit of claim 1, wherein the processor is operative to set signal to noise ratio parameters for an acceptable decoding result and to reject candidate decoding results falling outside the parameters.

8. The detection and decoding unit of claim 7, wherein the signal to noise ratio parameters are based on characteristics of a label symbology to be used.

9. The detection and decoding unit of claim 8, wherein the processor is operative to identify a label symbology of a bar code label being scanned and to select signal to noise ratio parameters associated with the label symbology.

10. A method of bar code detection and decoding, comprising the steps of:
generating a scan signal based on reflections of a scan pattern;
computing a plurality of signal to noise ratios for the scan signal;
processing the scan signal to generate a plurality of candidate decoding results representing one or more bar code data resulting from an attempt to decode a bar code;
evaluating the decoding results in light of the signal to noise ratios associated with portions of the scan signal from which the decoding result was generated, including performing a comparative evaluation of the candidate decoding results including a comparison of the signal to noise ratios; and
choosing one of the candidate decoding results based upon the comparative evaluation.

11. The method of claim 10, wherein the step of evaluating the decoding results includes comparing signal to noise ratio information associated with each decoding result against predetermined parameters and rejecting decoding results that fall outside the parameters.

12. The method of claim 11, wherein the signal to noise ratio parameters are selected based on characteristics of a label symbology to be used.

13. The method of claim 12, wherein the identification of a label symbology being used includes identification of the symbology of a bar code label being scanned.

14. The method of claim 13, wherein the identification of a label symbology includes using information received from partial scans of a bar code and, if the partial scan information is sufficient to identify the symbology being used, identifying the symbology of the bar code label using the partial scan information.

* * * * *